(12) United States Patent
Dumont

(10) Patent No.: US 6,403,723 B1
(45) Date of Patent: Jun. 11, 2002

(54) COMPOSITION OF ABS AND/OR ASA COPOLYMERS AND SAN COPOLYMERS WITH HIGH CHEMICAL RESISTANCE

(75) Inventor: Jean-Marie G. L. Dumont, Rosoy par Liancourt (FR)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/625,562

(22) Filed: Jul. 25, 2000

(30) Foreign Application Priority Data

Oct. 20, 1999 (FR) .............................. 99 13086

(51) Int. Cl.[7] .............................. C08L 9/00; C08L 9/02; C08L 25/02; C08L 33/18; C08L 33/20
(52) U.S. Cl. .................. 525/232; 525/233; 525/234; 525/238; 525/241
(58) Field of Search ................................. 525/232, 233, 525/234, 238, 241

(56) References Cited

U.S. PATENT DOCUMENTS 3,914,337 A 10/1975 Giddings et al.
4,017,559 A  4/1977 Deets et al.

*Primary Examiner*—Nathan M Nutter

(57) ABSTRACT

The composition comprises a mixture of at least one ABS and/or ASA copolymer and an SAN copolymer having an acrylonitrile concentration of at least 43% by weight, and the quantity of SAN copolymer in the mixture is such that the total acrylonitrile concentration in the mixture is at least 30% by weight when the mixture contains only an ABS copolymer and at least 28% when the mixture contains an ASA copolymer alone or combined with an ABS copolymer.

7 Claims, No Drawings

COMPOSITION OF ABS AND/OR ASA COPOLYMERS AND SAN COPOLYMERS WITH HIGH CHEMICAL RESISTANCE

The present invention relates, in general, to molding compositions with a base of an acrylonitrile butadiene styrene copolymer (ABS copolymer) and/or acrylonitrile styrene butyl acrylate copolymer (ASA copolymer) and a styrene acrylonitrile copolymer (SAN copolymer) having an increased chemical resistance and, in particular, a chemical resistance under increased stress.

ABS copolymer and/or ASA copolymer compositions are widely used for the manufacture of molded objects, in particular, housings, for example, electric razor housings.

In applications such as electric razor housings, objects molded from these compositions can be placed in contact with various chemical products, for example, alcohols and bornyl acetate generally contained in shaving lotions and aftershaves.

Objects molded from classic ABS and/or ASA copolymers are generally severely attacked by numerous chemical products such as acids like acetic acid, butyric acid, and nitric acid, phthalates like dioctyl phthalate, gasoline, greases, inks, iodine, alcohols like methyl alcohol, motor oils, phenols, glycols, tetrachloroethylene, [and] acetates like ethyl acetate, amyl acetate, and bornyl acetate.

Thus the object of the present invention is molding compositions with a base of ABS and/or ASA copolymers and an SAN copolymer permitting molded pieces having an increased chemical resistance to be obtained and, in particular, a chemical resistance under increased stress, without adversely affecting the other mechanical properties of the molded pieces.

According to the invention, a molding composition is furnished comprising a mixture that consists of at least one ABS copolymer and at least one ASA copolymer and an SAN copolymer, characterized in that the SAN copolymer has an acrylonitrile concentration ($C_{AN}$) greater than or equal to 43% by weight and is present in the copolymer mixture in a quantity such that:

the total acrylonitrile concentration ($TC_{AN}$) of the copolymer mixture is at least 30% by weight in relation to the total weight of the copolymer mixture when the mixture does not contain an ASA copolymer; and the total acrylonitrile concentration ($TC_{AN}$) is at least 28% by weight in relation to the total weight of the copolymer mixture when at least one ASA copolymer is present in the copolymer mixture.

The SAN copolymers that are suitable for the present invention must have an acrylonitrile concentration of at least 43% by weight, and preferably greater than 43%. In general, the acrylonitrile concentration of the SAN copolymer will be such that 43% by weight $\leq C_{AN} \leq$ 47% by weight.

Quite obviously, the SAN copolymer according to the invention can be a mixture of SAN copolymers having the required acrylonitrile concentration. The preferred SAN copolymer is a copolymer having an acrylonitrile concentration of approximately 45% by weight.

As indicated above, when the copolymer mixture only consists of at least one ABS copolymer and at least one SAN copolymer according to the invention, the quantity of SAN copolymers must be such that the total acrylonitrile concentration in the mixture is at least 30% by weight, [and] preferably 31% or more by weight. In general, in this case, the total acrylonitrile concentration in the mixture will be on the order of 31 to 35% by weight.

Likewise, when the copolymer mixture consists of a mixture of at least one ASA copolymer and an SAN copolymer according to the invention, or a mixture of at least one ABS copolymer, at least one ASA copolymer, and an SAN copolymer according to the invention, the total acrylonitrile concentration of the mixture must be at least 28% by weight. Preferably, the total concentration is greater than 28% by weight and generally will be on the order of 30 to 35% by weight.

The acrylonitrile concentrations of the ABS and ASA copolymers are data that are generally furnished by the manufacturers or that can be easily determined. The acrylonitrile concentration of these copolymers is generally from 10 to 30% by weight and classically is on the order of 12% by weight.

In the compositions according to the invention, ABS or ASA copolymers having acrylonitrile concentrations of approximately 10 to 20% by weight are preferably used.

Thus, knowing the acrylonitrile concentrations of the ABS and/or ASA copolymers, a person skilled in the art can easily determine the quantity of SAN copolymers necessary to achieve the total acrylonitrile concentration required for the formulated composition.

However, the compositions according to the invention will generally contain 30 to 70% by weight, [and] preferably 30 to 50% by weight, of ABS and/or ASA copolymers and 30 to 70%, [and] preferably 50 to 70% by weight of SAN copolymers according to the invention.

ABS copolymers, such as ABS graft copolymers, and ASA copolymers are materials that are well known in the technology and are available on the market.

The compositions according to the invention can also contain all adjuvants classically used, such as antioxidants, internal or external lubricants, pigments, dyes, flame retardants, antistatic agents, UV stabilizers, coupling agents, impact strength modifiers, and extenders and/or reinforcing fillers.

These adjuvants are used in the classic proportions.

In the following examples, unless indicated otherwise, all percentages and portions are expressed by weight.

The quantities of adjuvants are expressed as a percentage by weight in relation to the total weight of the copolymer mixture.

Example of the Manufacture of an SAN Copolymer ($C_{AN}$=45% by weight)

Twenty-two parts by weight of styrene, 45 parts by weight of acrylonitrile, 100 parts by weight of water, 0.1 part by weight of polyvinyl alcohol, 0.56 part by weight of TDM, 0.028 part by weight of BCUP, and 0.04 part by weight of DTBP are mixed in a reactor, and the temperature of the mixture is increased to 120° C. After the mixture has been maintained at 120° C. for 30 minutes, 33 parts by weight of styrene are added over 4 hours with a linear introduction profile and [with the temperature] always at 120° C.

At the end of the styrene addition, the temperature of the mixture is increased to 140° C. (generally over 45 minutes), and the mixture is maintained at that temperature for 3 hours 45 minutes. The mixture is then cooled, and the SAN copolymer is recovered in the classic manner.

Comparative Examples A to C and Examples 1 to 4

The molding compositions in Table I below were prepared in the classic manner using an internal mixer.

TABLE I

| Compositions (parts by weight) | | | | | | | |
|---|---|---|---|---|---|---|---|
| | Ex. A | Ex. B | Ex. C | Ex. 1 | Ex. 2 | Ex. 3 | Ex. 4 |
| ABS/ASA copolymers | | | | | | | |
| TAG 63E | 35 | 10 | 28 | 35 | 35 | 35 | 28 |
| ASA | — | — | 20 | — | — | — | 20 |
| SAN copolymer | | | | | | | |
| SAN 1 | — | — | — | 65 | — | — | — |
| SAN 2 | — | — | — | — | 65 | — | — |
| SAN 3 | — | — | — | — | — | 65 | 52 |
| SAN 3457 | 65 | 90 | 52 | — | — | — | — |
| TC$_{AN}$ (%) | 26.4 | 31.8 | 25.68 | 34.1 | 32.15 | 33.45 | 31.4 |
| Adjuvants | | | | | | | |
| Ethylene bis stear-amide wax | 3 | 3 | 3 | 3 | 3 | 3 | 3 |
| DRT4A* | 0.05 | 0.05 | 0.05 | 0.05 | 0.05 | 0.05 | 0.05 |
| MBTSF | 0.7 | 0.7 | 0.7 | 0.7 | 0.7 | 0.7 | 0.7 |
| PRINTEX 85 | 1 | 1 | 1 | 1 | 1 | 1 | 1 |

*Perhaps replaced with 0.1 part by weight of MgO.
SAN 1: SAN copolymer C$_{AN}$ = 46%, intrinsic viscosity 0.60
SAN 2: SAN copolymer C$_{AN}$ = 43%
SAN 3: SAN copolymer C$_{AN}$ = 45%, intrinsic viscosity 0.73
SAN 3457: SAN copolymer C$_{AN}$ = 34%
TAG 63E: ABS graft copolymer with 12% by weight of acrylonitrile (General Electric Plastics)
ASA: HRG 29350 GENERAL ELECTRICS PLASTICS (C$_{AN}$: 19% by weight)
DHT4A: Hydrotalcite
MBTSF: TAG 63E-silicone oil masterbatch 1000 cPs (87/13)
PRINTEX 85: Carbon black The compositions in Table I underwent the tensile strength tests described below which permitted verification of the aggressiveness of chemical agents vis-à-vis objects molded from these compositions.

To do this, the compositions were molded into ISO 527-type tensile specimens under standard conditions for standard grade ABS [at] 240° C.

Then four specimens molded from each composition underwent tensile tests at increasing stress levels of 0.3%, 0.5%, 0.7%, and 1%. The center portion of each specimen in the shape of a dumbbell was covered during the test with 13 drops of a chemical agent over approximately 3 cm.

The results obtained after 1 hour of application of the stress were noted. Two situations were possible:

either the specimen was broken on the test machine or exhibited an incipient fracture, and the chemical resistance was considered to be poor;

or the specimen was not broken and did not exhibit an incipient fracture, in which case the specimen was then wiped with absorbent paper to remove the chemical agent.

The properties of the specimen under tension, tensile strength, and elongation at break were measured, and they were compared with those of a control that had not undergone any stress or been subjected to the chemical agent.

A decrease of 40% at the most in the initial value of the elongation at the break or the tensile strength was considered to be an indication that the composition did not pass the test.

The maximum stress in the presence of a chemical agent could thus be determined for each composition.

The composition was all the better or more resistant to the chemical agent since the stress level was higher (1%) and the elongation at break and tensile strength values were higher.

The results are given in Table II below.

TABLE II

| Composition no. | Chemical agent | Elongation at break (%) | | | | | Tensile Strength (MPa) | | | | | Melt flow rate at 220° C. (g/10 minutes) | Izod impact strength (1A/180) (kJ/m$^2$) | Hardness VICAT B120 (° C.) | Flexural modulus (MPa) |
|---|---|---|---|---|---|---|---|---|---|---|---|---|---|---|---|
| | | 0% | 0.3% | 0.5% | 0.7% | 1% | 0% | 0.3% | 0.5% | 0.7% | 1% | | | | |
| A | (1) | 30.6 | 23.2 | 7.8 | 3.2 | X | 42.2 | 40.9 | 19.1 | 13.5 | X | 18.6 | 18.3 | 101.5 | 2.36 |
| A | (2) | 22.8 | 9.8 | 1.1 | 1.7 | — | 40.5 | 31 | 20.8 | 28.1 | — | 19.5 | 20.2 | 103 | 2.39 |
| B | (1) | 34.1 | 30.2 | X | X | X | 56.8 | 53.3 | X | X | X | 46.4 | 3.7 | 106.5 | 3.29 |
| 1 | (1) | 37.9 | — | 36.4 | 38.3 | 25.7 | 46.2 | — | 46.4 | 46.1 | 44.2 | 8.5 | 13.1 | 102.5 | 2.4 |
| 2 | (I) | 34.8 | 34.2 | 34.4 | 34 | 6.4 | 45.3 | 45.3 | 45.4 | 45.4 | 43.7 | 8.4 | 17.9 | 102.5 | 2.46 |
| 3 | (2) | 29 | — | 19.8 | 1.5 | 1.6 | 44.8 | — | 45.3 | 32.3 | 31.2 | 5.2 | 22.8 | 101 | 2.3 |
| C | (2) | 23.1 | 13 | 7.7 | 10.7 | — | 35.7 | 36 | 36.4 | 36.4 | — | 9.9 | 23.5 | 99.5 | 1.88 |
| 4 | (2) | 81.3 | 75 | 73.9 | 71.2 | — | 38.2 | — | 38.5 | 38.4 | — | 5.8 | 15.4 | 101 | 2.03 |

Chemical agent:
(1) bornyl acetate
(2) PITRALON ®
X specimen broken during the test The results in Table II show that the specimens molded from the compositions of the invention have a chemical resistance superior to that of prior art compositions.

What is claimed is:

1. Molding composition comprising a mixture that consists of at least one ABS copolymer and/or at least one ASA copolymer and an SAN copolymer, characterized in that the SAN copolymer has an acrylonitrile concentration ($C_{AN}$) greater than or equal to 43% by weight and is present in the copolymer mixture in a quantity such that:

the total acrylonitrile concentration ($TC_{AN}$) of the copolymer mixture is at least 30% by weight in relation to the total weight of the copolymer mixture when the mixture does not contain an ASA copolymer; and the total acrylonitrile concentration ($TC_{AN}$) is at least 28% by weight in relation to the total weight of the copolymer mixture when at least one ASA copolymer is present in the copolymer mixture.

2. Molding composition according to claim 1, characterized in that the acrylonitrile concentration of the SAN copolymer ranges from 43 to 47% by weight.

3. Molding composition according to claim 1, characterized in that the acrylonitrile concentration of the SAN copolymer is 45% by weight.

4. The molding composition of claim 1 characterized in that the mixture does not contain an ASA copolymer and the quantity of SAN copolymers is such that the total acrylonitrile concentration of the mixture is 31 to 35% by weight.

5. The molding composition of claim 1 characterized in that the mixture contains an ASA copolymer and the quantity of SAN copolymer is such that the total acrylonitrile concentration is 30 to 35% by weight.

6. The molding composition of claim 1 characterized in that the ABS and ASA copolymers have an acrylonitrile concentration of 10 to 20% by weight.

7. The molding composition of claim 1 characterized in that it further contains adjuvants selected from among antioxidants, internal or external lubricants, pigments, dyes, flame retardants, antistatic agents, UV stabilizers, coupling agents, impact strength modifiers, and extenders and/or reinforcing fillers.

* * * * *